US005479519A

United States Patent [19]

Davis

[11] Patent Number: 5,479,519

[45] Date of Patent: Dec. 26, 1995

[54] SIGNALIZATION WITH TRUE "ON AIR" EVENT INCLUDING OPTO-ISOLATION

[75] Inventor: Donald E. Davis, Margate, Fla.

[73] Assignees: Sony Corporation, Japan; Sony Electronics Inc., Park Ridge, N.J.

[21] Appl. No.: 202,030

[22] Filed: Feb. 25, 1994

[51] Int. Cl.[6] ........................ H04B 1/00

[52] U.S. Cl. ........................ 351/119

[58] Field of Search ........................ 381/119, 123

[56] References Cited

U.S. PATENT DOCUMENTS

| | | | |
|---|---|---|---|
| 4,479,240 | 10/1984 | McKinley, Jr. | 381/119 |
| 5,204,908 | 4/1993 | Sims | 381/119 |
| 5,233,666 | 8/1993 | Deveau | 381/119 |
| 5,259,034 | 11/1993 | Lumsden | 381/119 |

*Primary Examiner*—Forester W. Isen

*Attorney, Agent, or Firm*—Ronald P. Kananen

[57] ABSTRACT

Disclosed is a device which provides a logic signal that indicates a true "on air" event during broadcast production. Each audio channel input from a microphone to a mixing console is coupled to a circuit arrangement which determines whether a mute switch is selected, a fader is set for full attenuation, or an input switch is deselected. If none of these events have occurred a signal is provided to an external display which is optically isolated from the mixing console. This signal controls a tally which indicates to a user that the corresponding input channel, for example, from a microphone is active.

5 Claims, 2 Drawing Sheets

SIGNALIZATION WITH TRUE " ON AIR" EVENT INCLUDING OPTO-ISOLATION

FIELD OF THE INVENTION

This invention relates to an apparatus for providing an optically isolated signal which indicates that an audio channel from a microphone or other input device is active.

BACKGROUND OF THE INVENTION

In many broadcasting applications, it is common for audio signals from various input devices to be fed to a central console from which they may be processed and/or broadcast to other locations. Typically the central console includes some type of mixer device by which the input audio signals may be routed to external devices, such as VTRs, or to broadcast devices which may feed a live signal.

Such an arrangement usually includes some type of means of controlling whether an input device such as a microphone is currently active. For example, the central console may include a mute switch which interrupts the signal path of the microphone. Further, the console may include an adjustable fader for adjusting the level of the audio channel which may be set at full attenuation of the signal.

In such applications, it is desirable to indicate to the user that an input channel is active, that is, currently "on air" or recorded. Such a tally helps prevent unwanted remarks, comments or noises from inadvertently being broadcast. For example, a sign stating "ON AIR" may be illuminated or some other prominent display may be used to alert the user that a microphone is active.

In the past, such indications have been provided by use of a simple "on air" light activated from a single button or switch. Alternatively, a tally of the fader control has been used. Such prior approaches are limited in several respects. For example, by monitoring only a single point at which the signal is interrupted, false on air signals may be sent in the event of failure of the monitoring circuitry. Moreover, such prior techniques often couple the console with the lamp which provides the tally. This introduces the risk of drawing power into the console which may interfere with the signals that are being broadcast or processed with the console.

Accordingly, there is a need to provide a method and apparatus by which proper signalization, that is, an output signal indicative of a true on air event, is accomplished in a reliable manner without the above-described limitations of the prior art.

SUMMARY OF THE INVENTION

It is an object of the invention to meet this need and others by providing an indication of whether an audio channel input to a mixer console is active. This object is accomplished with an apparatus that comprises the following: a logic circuit for detecting the position of a fader, the fader having a first position wherein the input audio channel is fully attenuated and a second position wherein the audio channel is maintained at full gain; a multi-pole mute switch having a first pole having an open and closed position, the closed position permitting the input audio signal to be routed to an output terminal and the open position interrupting the routing of the input audio signal, said mute switch having a second pole which routes a logic signal from the logic circuit when the first pole is in a closed position and interrupts the logic signal when the first pole is in an open position; at least one input select multi-pole switch having a first pole which routes the input audio signal from an input terminal when in a closed position and interrupts the input audio signal when in an open position, the input select switch having a second pole which routes the logic signal routed from the mute select switch when the first pole of the input select switch is in a closed position; optical switching means control for receiving the logic signal from the input select switch, the optical switching means opening and closing an electrical path based on the logic state of said logic signal; and means for providing a tally signal when the electrical path is closed.

According to one aspect of the invention, the apparatus is located in a single module of a mixer console wherein the single module controls two separate audio signals.

DETAILED DESCRIPTION OF THE PREFERRED EMBODIMENTS

Figure 1:
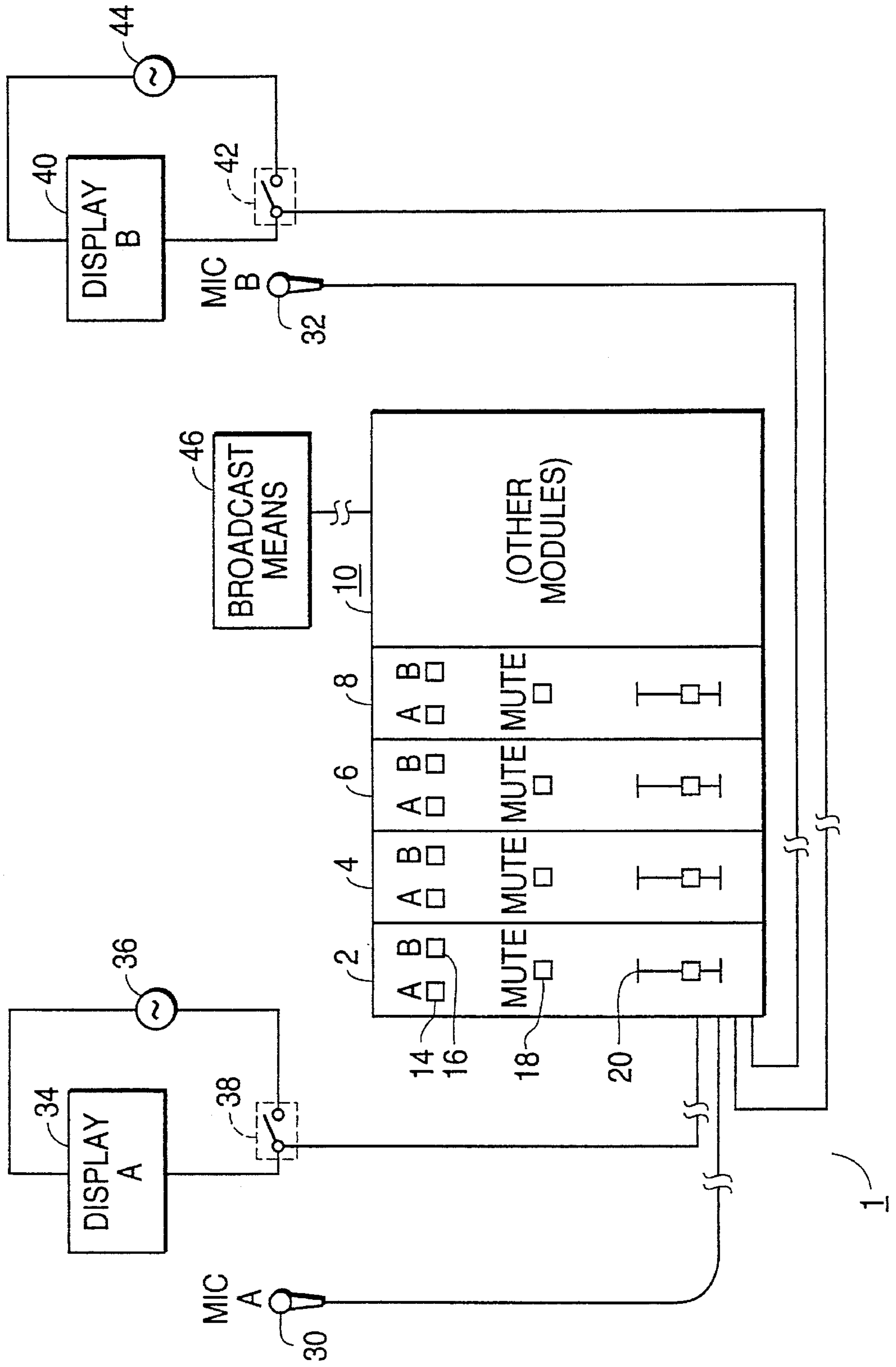
FIG. 1 is a representation of a broadcast production arrangement according to the present invention.

FIG. 1 shows an application of the invention in which one or more audio channels are input to a mixer console 1. A modular type mixer console 1 is shown in which a plurality of modules 2, 4, 6 and 8 each receives two audio inputs A and B from respective single-channel input devices 30 and 32 such as microphones. Each module 2, 4, 6 and 8 includes a pair of select switches 14 and 16 for selecting (or deselecting) one or both of the input audio channels A and B. While two channels are disclosed for each input module shown, more channels (or only one) may be used without departing from the scope of the invention.

While not shown, each audio channel A and B is provided to the mixer console from the input devices 30 and 32 through a connector port located on the input module. The audio channel is then both processed and routed by the input module. Because more than one channel is input to each module in this embodiment, each channel may be selected or deselected with a corresponding switch on the display portion of the input module. For example, in the embodiment shown, if both channels A and B are selected, then these channels will be summed together in the mixer.

Each input module further includes a linear fader 20. As known in the art, these devices are essentially potentiometers which provide a control signal to circuitry in the module that amplifies or attenuates an audio channel in the mixer. For example, each fader 20 may provide a control voltage which varies between 0 V and +5 V. This control voltage is provided to a control terminal of a variable amplifier, such as a voltage controlled amplifier (VCA). In the example shown, each fader 20 has a bottom position which corresponds to +5 V and a top voltage which corresponded to 0 V. The bottom position provides a control signal which results in full attenuation of the selected audio channels. The top position provides a control signal which results in full gain of the selected audio channels.

When not fully attenuated with the fader 20, the selected input channels are summed and routed elsewhere in the mixer console. However, this routing may be interrupted by use of a mute switch 18 provided on each of the mixer consoles. This mute switch 18 opens the path by which the audio signal processed in the input module is routed to the rest of the mixer. Thus, each module includes at least three ways by which an input signal from one of the input devices can be interrupted: by deselecting the input channel, by fully attenuating the selected signals, or by opening the mute switch.

As shown, the mixer console may include other modules 10. These may consist of other input modules or modules which communicate with external equipment. For example, as shown, other such modules may provide one or more audio output signals to broadcasting equipment 46. The output audio signals may include the input audio signals provided to the input modules which are selected at the input modules and passed without full attenuation by the faders or muting with the mute switch.

In the preferred embodiment, each input module has an output port which is part of a signal path by which a display signal may be sent when an input channel is provided from an input module to other components of the mixer. For example, each input module is provided with a D-SUB connector that is coupled to an optical relay inside the module which in turn is operated according to a logic signal. When the relay closes a path in response to an audio channel becoming active, an external display 34 or 40 is coupled to a power source 36 or 44. This results in a visual display that indicates that the corresponding input channel is active.

In the embodiment shown, Display A 34 provides a visual display (such as "ON AIR") when the signal path between the display 34 and an external power supply 36 is closed in response to the signal input from MICA being routed through the input module. Preferably, the relay in the input module 2 controls an external switch 38 or 42, as shown. A similar display 40 is provided when MIC B becomes active.

Figure 2:
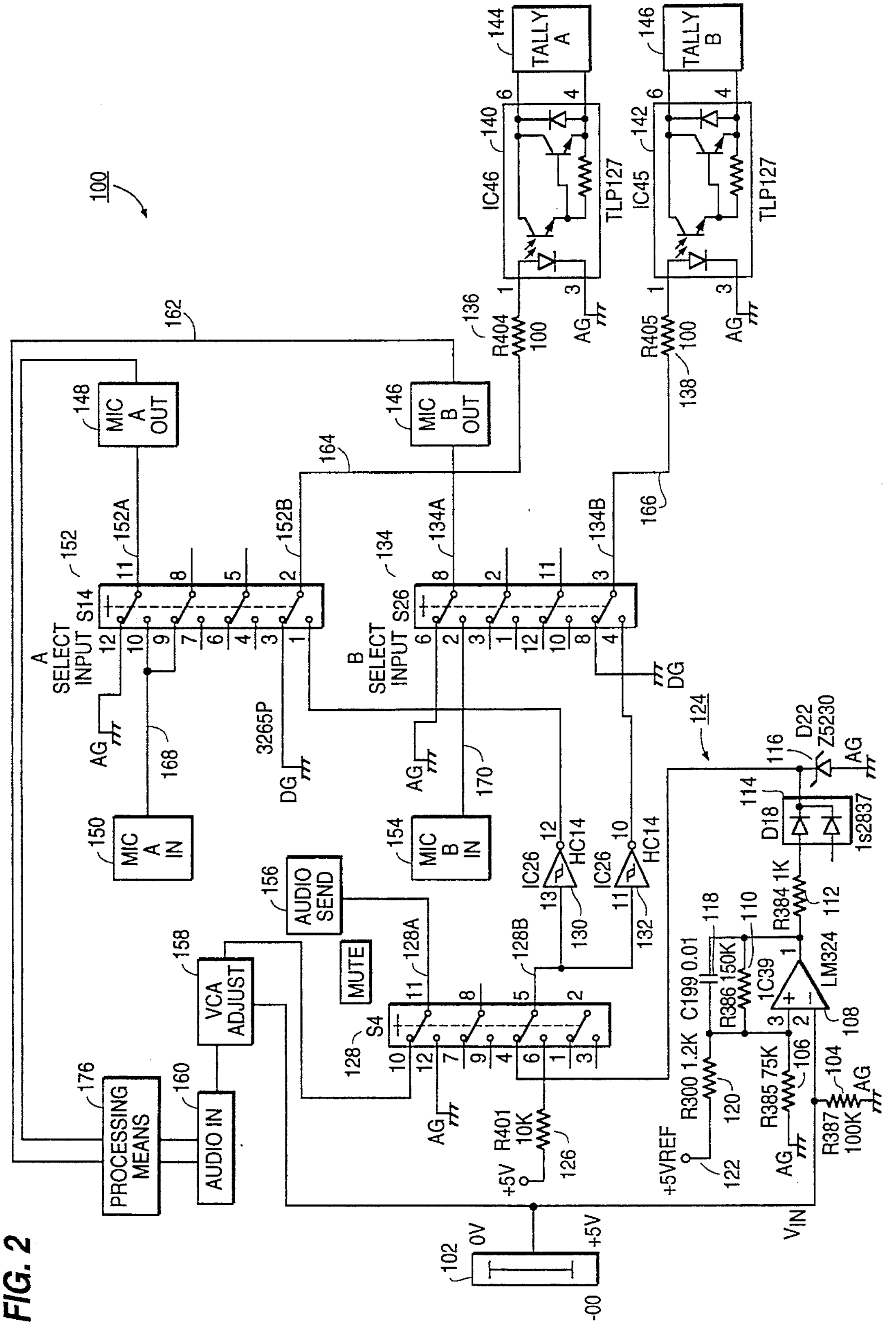
FIG. 2 is a circuit diagram of an embodiment of the present invention.

FIG. 2 is a schematic diagram illustrating an embodiment by which a tally of two "on air" inputs is obtained. The circuit 100 shown provides an optically coupled logic level command when the following events occur simultaneously: an audio fader on the input console is in a position which permits gull gain of an input signal, an input signal for the input module is selected, the input module's audio output is unmuted.

As shown, two audio signals are input from two microphone inputs 150 and 154 labelled respectively MICA IN and MIC B IN. Each of these signals is supplied to a respective multi-pole input select switch 152 and 134 through which the signals A and B are coupled to the mixer console. Each of these input select switches 152 and 134 control four signal paths, however, only two such paths, controlled by a first pole 152A, 134A and a second pole 152B, 134B, are shown. The first path 168, 170 for each channel couples the input signals to processing circuitry in the mixer console. The second path 164 and 166 controlled by the second poles 152B, 134B couples a logic signal which indicates that the audio channel is active.

More specifically, the first pole 152, 134A of the input select switches 152, 134 controls the electrical path between the input terminals for MICA and MIC B and the respective outputs 148, 146 (labelled MICA OUT and MIC B OUT) to processing circuitry 176 in the console. This circuitry 176 controls the audio signal which is provided to additional processing circuitry in the mixer 160 (labelled AUDIO IN). For example, if both the A and B select switches 152 and 134 are selected, that is placed in a position opposite to that shown in FIG. 2, the audio signals are active and processed in the mixer console. The selected signals may be summed, for example, and coupled to VCA adjust circuitry 158 which is used to control the level of the audio signal. The VCA adjust circuit 158 is controlled by the position of a fader 102, which outputs a control signal of from 0 V to +5 V to a VCA in the VCA adjust circuitry 158. Thus, an audio channel A or B input from the MIC inputs A 150 or B 154 is coupled via an input select switch 152, 134 to the input module.

The input select switches 152, 134 further control paths 164, 166 for signals that indicate whether an input audio channel A or B is active. The logic signal paths 164, 166 both begin with a logic circuit 124 which detects the position of the fader 102. When the fader 102 is at a position in which the signal from the AUDIO IN circuit is unattenuated by the VCA adjust circuit 158, the logic circuit 124 provides a first logic signal (logic LOW in the example shown). When the fader 102 is set for attenuation of the audio signal, the logic circuit 124 provides a second logic signal (logic HIGH in the example shown).

More particularly, as shown the fader 102 outputs a +5 V signal when set for full attenuation by moving the sliding member to a down position and outputs a 0 V signal when moved to an up position. This voltage signal is provided to the noninverting input of a comparator 108, which is configured to compare the voltage signal VN to a reference voltage which is slightly less than +5 V. By selecting appropriate values for the resistors 104, 106, 120, 110 and 112 and the capacitor 110, this comparator circuit outputs a positive voltage of approximately +5 V when the input voltage from the fader 102 is +5 V (that is, when the fader 102 is in a down position) and outputs a voltage of approximately 0 V when the input voltage is 0 V (that is, when the fader 102 is in an up position). The diode 114 prevents negative voltages from being output while zener diode 116 Limits the output from the logic circuit to +5 V. In this way, a logic signal is output which is low (0 V) when the fader 102 is up and high (+5 V) when the fader 102 is down.

This logic signal is coupled to a multi-pole mute switch 128. The mute switch 128 has a first pole 128A which controls the path from the VCA adjust output to AUDIO SEND circuitry. That is, the first pole 128A controls whether selected audio input signals processed in the input module are coupled to other modules from which they are broadcast. In FIG. 2, the mute switch 128 is shown in a closed position which would permit any selected inputs to be broadcast.

Similar to the input select switches 132 and 134, a second pole 128B of the mute switch follows the same position as the first pole 128A. Thus, when the first pole 128A is closed, as shown, the second pole 128B is closed, thereby providing the logic signal from the logic circuit to the logic paths 164 and 166 coupled to the second poles 152B, 134B of the input select switches 132, 134. When the mute button 128 is selected however, the poles 128A, 128B are opened. This results in the signal path form the VCA adjust circuitry 158 being interrupted and the output of the second pole 128B being coupled to a +5 V voltage (that is a logic high level).

This output from the second pole 128B of the mute switch is coupled to inverters 130 and 132 located on both signal paths between the mute switch 128 and the input select switches 152, 134. Thus, a low signal is input through the input select switches 152, 134 when either the mute switch 128 is open or the fader 102 is in a down position. Further, since the second poles 152B, 134B of both the input select switches are coupled to ground when the respective switch 152, 134 is an open position, a low signal is output from input select switches when any of the following events occur: the fader 102 is down, the mute switch 128 is open (mute selected), or the select input switch 152 or 134 is open (input deselected). A high output is provided only when the fader 102 is up, the mute switch 128 is off (closed) and the input switch 154 or 134 is on (closed). A logic signal is provided for both the input channels A and B.

The respective logic signals from the select switches 154 and 134 are coupled via a resistor 136 to ground through a light emitting diode (LED) which is located in an optical relay 140 and 142. The LED emits a light when a high logic signal is received and remains unilluminated when a low logic signal is received. The LED is optically coupled to a phototransistor which is rendered in a conductive state when the LED emits light. In such a conductive state the phototransistor turns on a switching transistor in the relay driver 140, 142, thereby closing a signal path to a tally 144, 146 located external from the module. The tally 144, 146, again, could be a sign near the corresponding microphone which illuminates when the high logic signal is output to the relay. Preferably, the relays 144, 146 each control the operation of switches that couple the displays to a power source.

Because the relay utilizes optical coupling, the mixer console remains isolated from the power source which drives the tally. This prevents any unwanted power form introducing noise and distortion in the audio signals processed in the mixer console. It further protects the circuitry of the mixer console from power overloads. Accordingly, the preferred embodiment provides a safe and reliable method of indicating a true on air event.

The foregoing is a detailed description of the preferred embodiment. The scope of the invention, however, is not so limited. Various alternatives will be readily apparent to one of ordinary skill in the art. The invention is only limited by the claims appended hereto.

What is claimed is:

1. An apparatus for providing an indication of whether at least one input audio channel input to a mixer console is active comprising:

a logic circuit for detecting the position of a fader, the fader having a first position when the input audio channel is fully attenuated and a second position when the audio channel is maintained at full gain;

a multi-pole mute switch having a first pole having an open and a closed position, the closed position permitting the input audio signal to be routed to an output terminal and the open position interrupting the routing of the input audio signal, said mute switch having a second pole which routes a logic signal from the logic circuit when the first pole is in the closed position and interrupts the logic signal when the first pole is in the open position;

at least one input select multi-pole switch having a first pole which routes the input audio signal from an input terminal when the first pole of the select switch is in a closed position and interrupts the input audio signal when the first pole of the select switch is in an open position, the input select switch having a second pole which routes the logic signal routed from the mute switch when the first pole of the input select switch is in the closed position;

optical switching means for receiving the logic signal from the input select switch and for opening and closing an electrical path based on the logic state of said logic signal; and means for providing a tally signal when said electrical path is closed.

2. The apparatus of claim 1 wherein two input audio channels are provided to two input terminals which are each coupled to a corresponding input select switch.

3. The apparatus of claim 2 wherein the mixer console is a modular type mixer console having a plurality of input modules each receiving one or more input audio channels.

4. The apparatus of claim 3 wherein each of said input modules includes a connector which forms a part of said electrical path by which said means for providing a tally signal are located at a location external to the mixing console.

5. The apparatus of claim 4 wherein said means for providing a tally signal provide a visual display which indicates that the input channels is active.

* * * * *